March 17, 1953 B. F. LAWRENCE ET AL 2,631,551
ICE-CREAM SCOOP
Filed May 4, 1951 2 SHEETS—SHEET 1
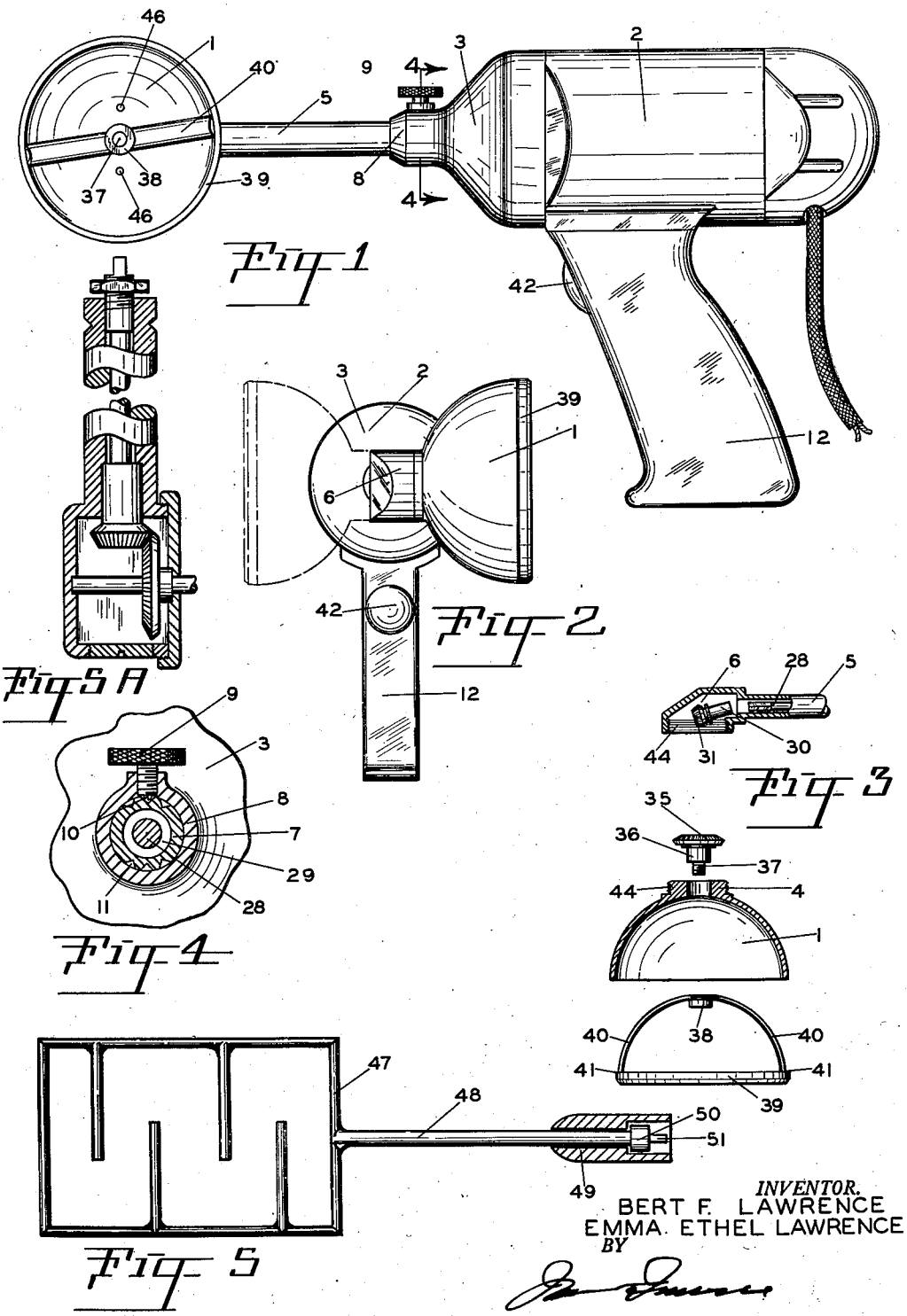
INVENTOR.
BERT F. LAWRENCE
EMMA ETHEL LAWRENCE
BY
ATTORNEY

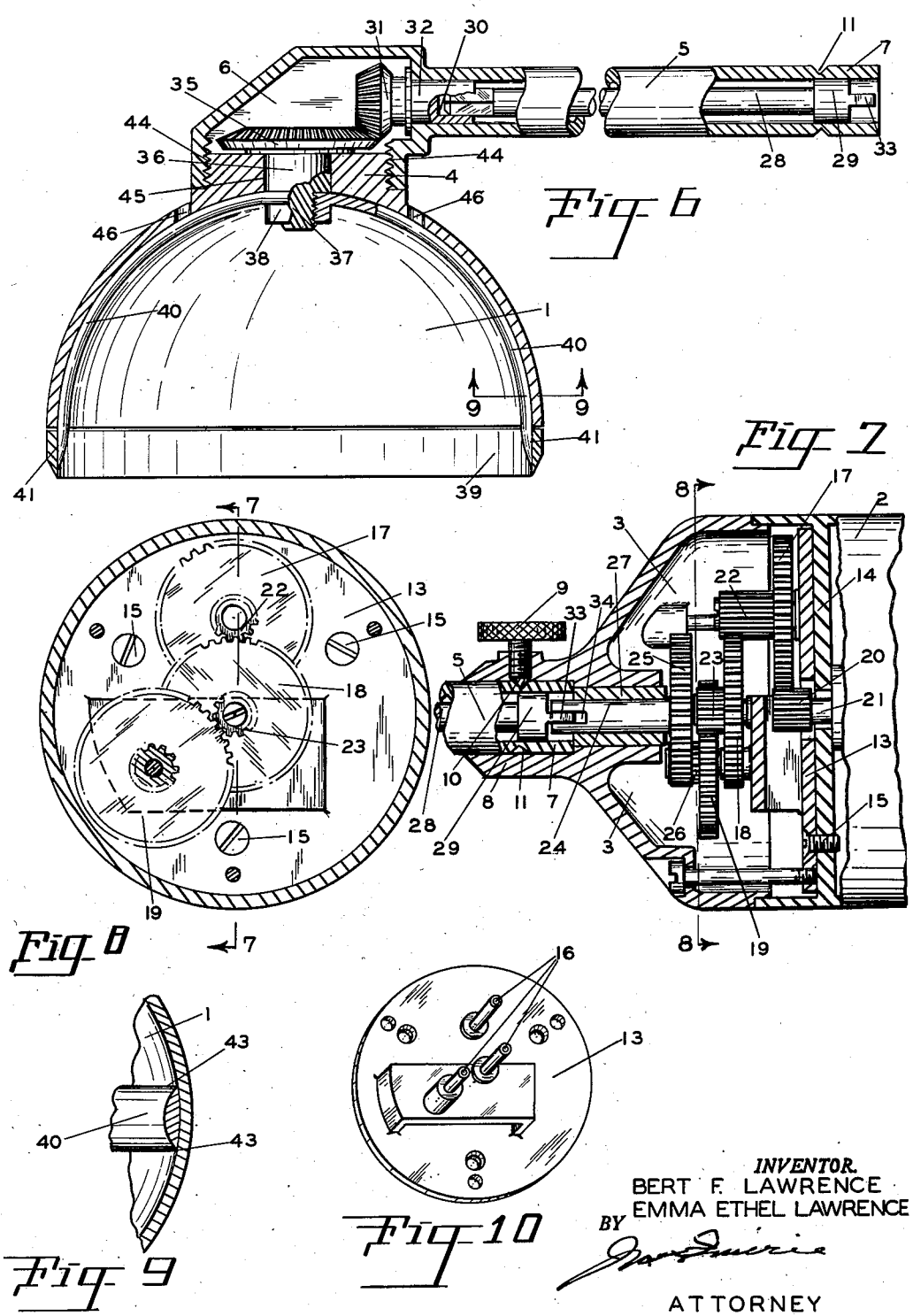

Patented Mar. 17, 1953

2,631,551

UNITED STATES PATENT OFFICE 2,631,551

ICE-CREAM SCOOP

Bert F. Lawrence and Emma Ethel Lawrence, Portland, Oreg.

Application May 4, 1951, Serial No. 224,504

3 Claims. (Cl. 107—48)

This invention relates to ice cream scoops and is particularly related to power driven scoops.

The primary object of this invention is to design a driving mechanism between a motor and a revolving cutter associated with the bowl of an ice cream scoop, said driving mechanism consisting of a train of gears that can be disassembled easily for cleansing.

A further object of this invention is the mounting of the scoop to the motor and supporting handle so that the scoop can be revolved to any angle in regards to the handle and motor in its operation, providing a scoop that can be used by either the right or left hand, or angles in between.

Another object of the invention is the provision of a driving mechanism associated with a handle that can be used to drive beaters, scrapers and other auxiliary equipment by a special attachment for adapting the same to the said motor.

These and other incidental objects will be apparent in the drawings, specification and claims.

Referring to the drawings:

Figure 1 is a side view of our new and improved ice cream scoop.

Figure 2 is an end view, taken of Figure 1, looking into the scoop and showing the scoop in a position for right hand operation, the broken lines indicating left hand operation.

Figure 3 is an exploded view of the driving gears for driving the cutting device and the scoop, illustrating how all of the parts can be dismounted for cleansing.

Figure 4 is a fragmentary end sectional view, taken on line 4—4 of Figure 1, illustrating the method of attaching the scoop mechanism to the driving motor and handle.

Figure 5 is a side view of a beater, illustrating the adapter for mounting the same to the driving motor.

Figure 5A shows another preferred form of gear assembly.

Figure 6 is an enlarged sectional view of the scoop, the cutting blade and the driving gears.

Figure 7 is a fragmentary view of the driving end of the motor, illustrating how the scoop assembly is attached to the motor and driven from the motor by a special reduction gear assembly. This view is taken on line 7—7 of Figure 8.

Figure 8 is an end sectional view, taken on line 8—8 of Figure 7, illustrating the driving gears and how they are mounted to the end of the motor.

Figure 9 is an enlarged fragmentary detail, taken on line 9—9 of Figure 6, illustrating the rotating cutter arms in relation to the scoop.

Figure 10 is a perspective view of the adapter base for mounting the reduction gears to the end of the motor.

Referring more specifically to the drawings:

Our invention consists of mounting an ice cream scoop 1 to the motor 2 by way of the special gear reduction unit 3. The scoop or bowl 1 has a threaded boss 4 forming part thereof, best illustrated in Figure 6. A hollow tube 5 has an enlarged housing 6 formed on its one end, having its opposite end 7 adapted to enter the socket 8 forming part of the gear housing 3, best illustrated in Figure 7.

A thumb screw 9 is threaded within the hub 8, having its point 10 adapted to enter the cone shaped depressions 11 formed around the outer periphery of the end 7 of the tube 5. The bowl 1 can be locked in any position relative to the handle 12 in the operation of the scoop by selecting any one of the cone shaped depressions 11 by the thumb screw 9.

A base plate 13 is secured to the end wall 14 of the motor 2 by way of screws 15. The base plate 13 has spindles 16 forming part thereof and adapted to receive the reduction gears 17, 18 and 19. The gear 17 is driven from the pinion 20 keyed to the motor shaft 21. The gear 18 is adapted to be driven from the pinion 22 forming part of the gear 17, while the gear 19 is adapted to be driven from the pinion 23 forming part of the gear 18.

A stub shaft 24 is adapted to be driven by the gear 25 keyed thereto, the said gear 25 in turn being driven from the pinion 26 forming part of the gear 19. The said stub shaft 24 is journalled within a bearing 27 located within the gear housing 3. We do not wish to be limited to the exact type of gear reduction used, although the one illustrated is admirably adapted to drive the shaft 28, which is journalled within the tube 5 at 29 on its one end, and adapted to slide into the squared socket 30 of the pinion 31 at its opposite end. The hub 32 of the pinion 31 extends into the tube 5 and acts as a bearing for the pinion.

A cross key 33, forming part of the bearing end 29 of the shaft 28, enters the cross slot 34 formed in the end of the stub shaft 24 for the purpose of imparting rotation from the said stub shaft to the shaft 28, best illustrated in Figure 7. A pinion 35, having its hub 36 journalled within the boss 4 of the bowl 1, is driven by the pinion 31. A reduced threaded portion 37 extends from the hub 36 and is adapted to have the removable hub 38 threaded thereon as best illustrated in Figure 6. An ice cream cutting ring 39 is adapted to be rotated in relation to the bowl 1 by the arms 40, which form part of the hub 38 and are attached to the ring 39 at 41 by any suitable means.

In the operation of the scoop, the operator grasps the handle 12. A special enclosed switch 42 is compressed starting the motor 2, revolving the reduction gear assembly and the stub shaft 24, which in turn revolves the shaft 28, rotating the pinion 31, pinion 35 and the cutting ring 39 relative to the scoop or bowl. This cuts the ice cream permitting the bowl to easily enter into the hard cream. The arms 40 are shaped as indicated especially in Figure 9 so that their edges 43 will cut through the ice cream.

The gears are made of such a material as to insure long wear without lubrication and they are enclosed in the housing 6. When it is desired to clean the bowl and driving gears, the operator grasps the bowl in one hand and the cutting ring 39 in the opposite hand unthreading the hub 38 from the hub 36 of the gear 35, removing the same therefrom. Next he will hold the housing 6 in one hand, grasping the bowl 1 in the opposite hand unthreading the boss 4 from the housing 6 by way of the threads 44. He can then invert the bowl dropping the pinion 35 out of its bearing 45 for cleansing. This will permit the pinion 31 to be dropped out of the housing 6.

On removing the tube 5 from the socket 8 of the gear housing by loosening the thumb nut screw 9, the tube can be removed and the shaft 28 dropped out of the said tube for cleansing. The parts of the driving assembly can be easily removed from one another as best illustrated in Figure 3 for cleansing or replacing, which is necessary in order to meet the requirements of the health department. This is a very important feature of our invention.

Another feature of our invention is illustrated in Figure 2 wherein the bowl can be adjusted to any angle in regards to the handle of the scoop by simply loosening the thumb bolt 9, permitting the tube 5 to be rotated to the desired position.

In order to permit the ice cream to enter the bowl easily, holes 46 are provided as best illustrated in Figure 6, passing through the bowl permitting the air to escape as the ice cream comes into the bowl. When the ice cream has been removed from the container, it can be removed from the bowl by simply starting the motor momentarily which causes the ice cream to fall out of the bowl, although in some cases it will drop out of its own accord.

Referring to Figure 5, we illustrate how beaters, scrapers and the like may be applied to the driving motor 2 by way of its gear reduction unit 3. The beater is indicated at 47, having a driving shaft 48 operating within a bearing 49. The bearing 49 is maintained on the driving shaft 48 by the collar 50, the said collar 50 having a cross key 51 adapted to enter the slot 34 of the driving shaft 24, referring to Figure 7, while the bearing 49 is adapted to enter the socket 8 and be locked therein by the thumb screw 9.

What we claim is:

1. An ice cream spoon, comprising a bowl formed with a threaded boss having a central bearing opening, a gear having a hub mounted in the bearing opening, the hub on the gear having a threaded stem, scraper blades mounted on the threaded stem, said blades conforming to and engaging the interior wall of the bowl, a casing screwed on the threaded boss on the bowl, the casing having a hollow handle, a bevelled gear formed with a sleeve provided with a flange, the bevelled gear meshing with the gear mounted on the threaded boss and the sleeve being fitted in the hollow handle, the flange on the sleeve fitting against the wall of the casing to retain the gears in mesh, the sleeve having a square socket, a shaft mounted in the handle, one end of the shaft being square to fit in the square socket, the opposite end of the shaft having a flange to receive a connection to operate the shaft.

2. An ice cream spoon, comprising a bowl having a threaded boss formed with a central bearing opening, a gear having a hub mounted in the bearing opening, the hub having a threaded stem, scraper blades threaded on the threaded stem to support the scraper blades and retain the gear and its hub in position on the boss, a cutter at the edge of the bowl, the cutter being supported at the ends of the scraper blades, an escape opening formed in the top of the bowl adjacent the threaded boss, a casing screwed on the threaded boss, a hollow handle extending from the casing, a gear having a sleeve on which is a flange, the gear engaging the gear mounted on the boss, the flange bearing against a wall of the casing to retain the gears in mesh, and the sleeve fitting in the hollow handle, a shaft in the hollow handle, detachable means for connecting the handle to the sleeve.

3. An ice cream spoon as defined in claim 2, wherein the handle near one end is provided with a series of indentations, a tubular support fitted over the end of the handle and a screw on the tubular support to engage any one of the indentations to change the angular position of the bowl with reference to the tubular support.

BERT F. LAWRENCE.
EMMA ETHEL LAWRENCE.

REFERENCES CITED

The following references are of record in the file of this patent:

UNITED STATES PATENTS

| Number | Name | Date |
| --- | --- | --- |
| 1,391,221 | Tuttle | Sept. 20, 1921 |
| 1,475,153 | Athenas | Nov. 20, 1923 |
| 1,691,200 | Krug | Nov. 13, 1928 |
| 1,896,731 | Lippett | Feb. 7, 1933 |
| 2,153,433 | Schaefer | Apr. 4, 1939 |
| 2,278,095 | Rogers | Mar. 31, 1942 |
| 2,547,651 | McCrum | Apr. 3, 1951 |